US005292421A

United States Patent [19]

Senapati et al.

[11] Patent Number: 5,292,421
[45] Date of Patent: Mar. 8, 1994

[54] APPARATUS AND METHOD FOR REMOVAL OF LIQUIDS

[76] Inventors: Nagabhusan Senapati, 1188 Kilham Ct., Worthington, Ohio 43235; Harold W. Johnson, 4222 Cedar Valley, Kingwood, Tex. 77345; Byung C. Kim, 55 W. Livingston Ave., Apt. 307, Columbus, Ohio 43215; Satya P. Chauhan, 1073 Bluffpoint Dr., Columbus, Ohio 43235; Dennis A. Gamlen, 2315 Deer Meadow, Missouri City, Tex. 77459; Raju Eason, 11507 Gondola, Stafford, Tex. 77477; H. S. Muralidhara, 2660 Sawmill Forest Ave., Dublin, Ohio 40317; Matthew S. Zelinski, 446 Colonial Ave., Worthington, Ohio 43085

[21] Appl. No.: 841,095

[22] Filed: Feb. 25, 1992

Related U.S. Application Data

[62] Division of Ser. No. 400,296, Aug. 28, 1989, Pat. No. 5,114,560.

[51] Int. Cl.[5] .................. B01D 57/02; B01D 43/00; C02F 1/469
[52] U.S. Cl. .................. 204/300 R; 204/299 R
[58] Field of Search ..... 204/300 R, 300 EC, 299 EC, 204/299 R

[56] References Cited

U.S. PATENT DOCUMENTS

| | | | |
|---|---|---|---|
| 2,470,741 | 5/1949 | Gordon | 204/273 |
| 2,744,860 | 5/1956 | Rines | 204/45 |
| 2,939,223 | 6/1960 | Smith | 34/58 |
| 3,468,778 | 9/1969 | Hirs et al. | 204/45 |
| 3,543,408 | 12/1970 | Candor et al. | 34/1 |
| 3,641,680 | 2/1972 | Candor et al. | 34/1 |
| 3,705,847 | 12/1972 | Stiles | 204/81 |
| 3,864,249 | 2/1975 | Wallis | 210/19 |
| 3,865,697 | 2/1975 | Suggs | 205/117 |
| 3,931,682 | 1/1976 | Candor | 34/1 G |
| 3,965,581 | 6/1976 | Candor | 34/1 G |
| 3,999,302 | 12/1976 | Candor | 34/1 |
| 4,003,819 | 1/1977 | Kunkle et al. | 204/301 |
| 4,028,232 | 6/1977 | Wallis | 210/19 |
| 4,050,162 | 9/1977 | Candor | 34/1 |
| 4,090,937 | 5/1978 | Stoev et al. | 204/180 |
| 4,101,400 | 8/1978 | Pepping | 204/300 R X |
| 4,111,773 | 9/1978 | Candor | 204/304 X |

(List continued on next page.)

FOREIGN PATENT DOCUMENTS

| | | | |
|---|---|---|---|
| 2573994 | 6/1986 | France | 204/299 R |
| 50-26795 | 3/1975 | Japan | |
| 60-097011 | 5/1985 | Japan | 204/180.1 |
| WO80/00226 | 2/1980 | PCT Int'l Appl. | |

OTHER PUBLICATIONS

Lockhart, "Sedimentation and Electro-Osmotic Dewatering of Caol-Washery Slimes," vol. 60, Fuel, pp. 919-923 (Oct. 1981).

Fairbanks et al., "Acoustic Drying of Coal," IEEE Trans. on Sonics and Ultrasonics, vol. SU-14, No. 4, pp. 175-177, (Oct. 1967).

Fairbanks et al., "Acoustic Drying of Ultrafine Coals," Ultrasonics, pp. 165-167 (Jul. 1970).

*Primary Examiner*—Kathryn Gorgos
*Assistant Examiner*—John S. Starsiak, Jr.
*Attorney, Agent, or Firm*—Klaus H. Wiesmann

[57] ABSTRACT

A first electrode arrangement and a transport element are movable relative to a support. A working space is disposed between the movable elements for advancing moist material along a processing path. As the moist material advances, electrical current is passed through the material between the first electrode arrangement and a second electrode arrangement adjacent the transport element. An acoustic transducer arrangement disposed adjacent the working space simultaneously subjects the moist material to an acoustic field as the material moves along the processing path. The acoustic field is generated by an array of acoustic transducers spaced along part of the processing path.

6 Claims, 8 Drawing Sheets

U.S. PATENT DOCUMENTS

| | | | |
|---|---|---|---|
| 4,135,307 | 1/1979 | Candor | 34/1 |
| 4,189,845 | 2/1980 | Candor | 34/1 |
| 4,236,317 | 12/1980 | Candor | 34/1 |
| 4,244,804 | 1/1981 | Meglich | 204/300 |
| 4,331,525 | 5/1982 | Huba et al. | 204/300 EC X |
| 4,338,729 | 7/1982 | Candor | 34/1 J |
| 4,340,450 | 7/1982 | Saito | 205/136 |
| 4,359,826 | 11/1982 | Rounsley | 34/1 |
| 4,551,924 | 11/1985 | Candor | 34/1 |
| 4,561,953 | 12/1985 | Muralidhara et al. | 204/182.3 |
| 4,680,104 | 7/1987 | Kunkle et al. | 204/299 R |
| 4,747,920 | 5/1988 | Muralidhara et al. | 204/182.3 |
| 4,767,514 | 8/1988 | Candor | 204/183.1 |
| 4,780,188 | 10/1988 | Candor | 204/182.1 |
| 4,802,964 | 2/1989 | Muralidhara et al. | 204/300 R X |
| 4,877,503 | 10/1989 | Candor | 204/182.1 |
| 5,114,560 | 5/1992 | Senapati et al. | 204/300 R X |

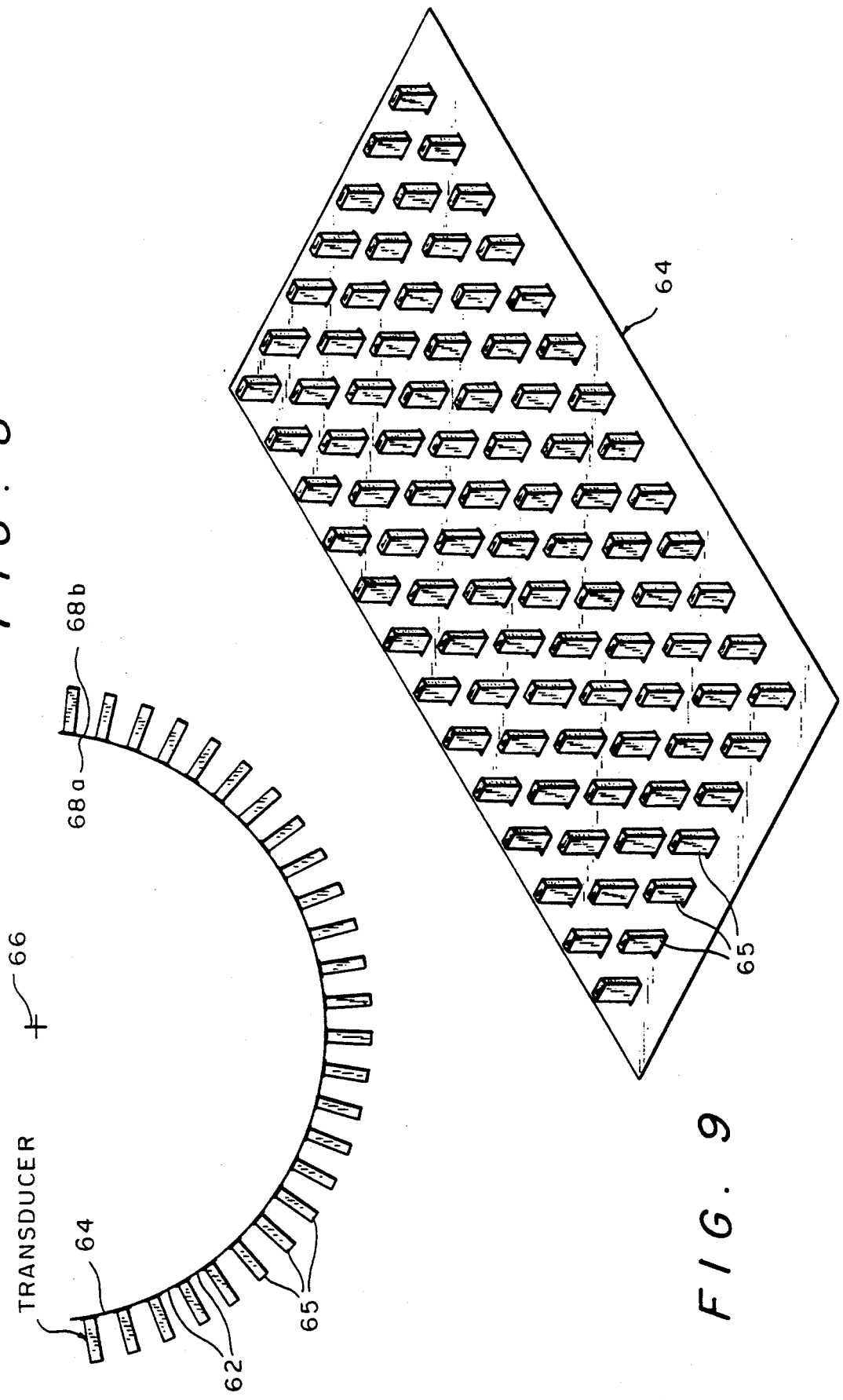

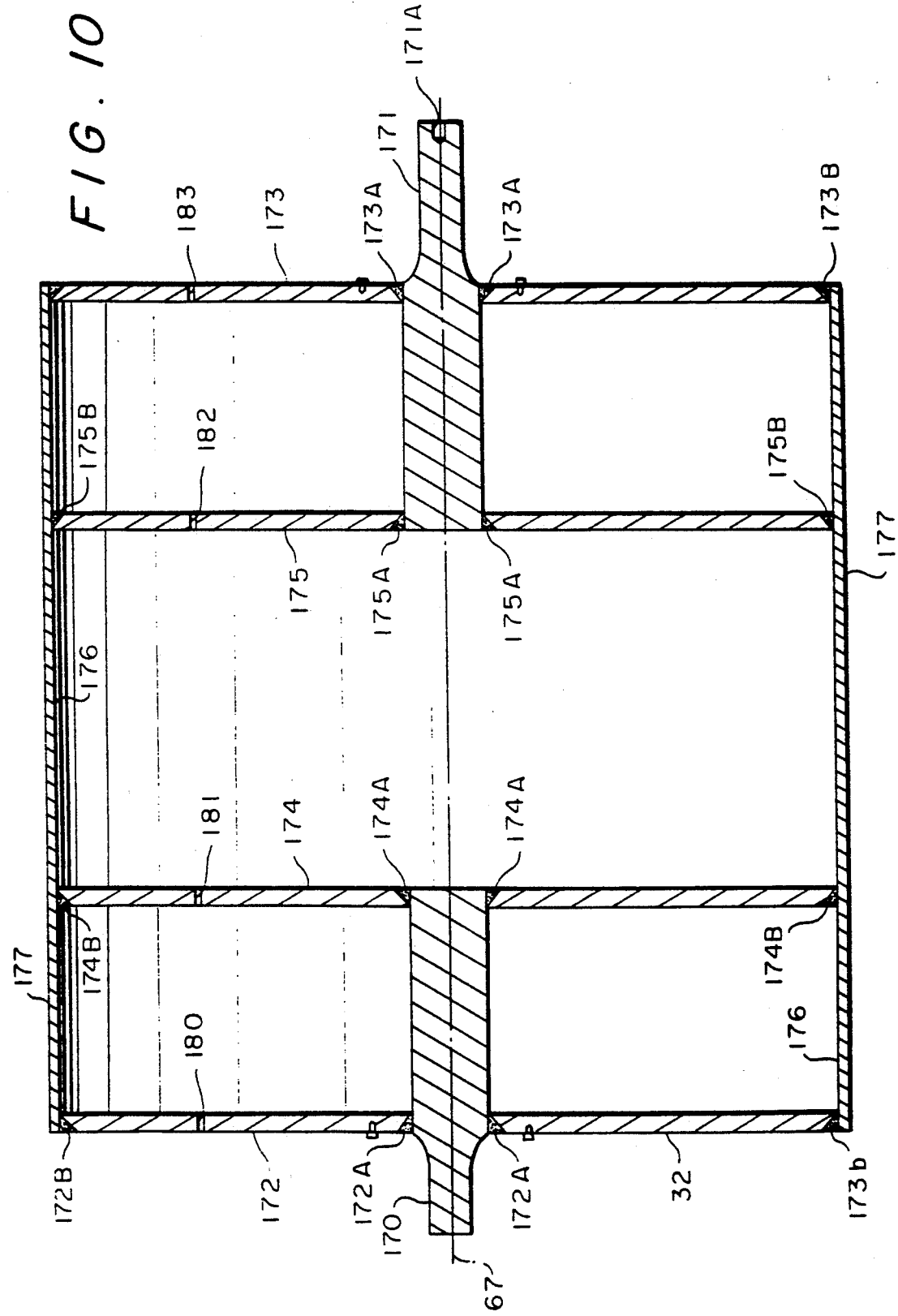

APPARATUS AND METHOD FOR REMOVAL OF LIQUIDS

This application is a division of application Ser. No. 07/400,296, filed Aug. 28, 1989, now U.S. Pat. No. 5,114,560.

BACKGROUND OF THE INVENTION

1. Field of the Invention

The invention relates to an apparatus and method for removing liquid from a moist material using simultaneous electric, acoustic and mechanical field forces.

2. Discussion of the Prior Art

It is known to remove water or other liquids from a suspension utilizing electrical fields and acoustical fields, (e.g. ultrasonic fields) to enhance the solid-liquid separation. Such processes are disclosed in U.S. Pat. Nos. 4,561,953 and 4,747,920 which are hereby incorporated herein by reference. In the processes disclosed by these U.S. patents the electrical fields contribute to the removal of liquids by a process known as electro-osmosis.

Nevertheless, before the present invention, a practical and successful way to simultaneously employ electro-osmotic and acoustic and mechanical solid-liquid separation techniques in a continuous process has not been known.

SUMMARY OF THE INVENTION

Accordingly, it is an object of the present invention to provide a method and apparatus employing simultaneous electro-osmotic, acoustic and mechanical solid-liquid separation techniques in a practical, continuous process which is economically efficient and provides increased product yield and energy savings.

It is a further object of the present invention to provide a method and apparatus utilizing simultaneous electro-osmotic, acoustic and mechanical solid-liquid separation techniques which provide for a continuous flow of material with minimal sliding motion between the material to be treated and the components which move the material.

It is also an object of the present invention to accomplish the foregoing results with minimal sliding motion between the material to be treated and the electrodes which provide the electric field through which the material to be treated passes.

It is a further object to the present invention to employ simultaneous electro-osmotic, acoustic and mechanical liquid separation techniques under circumstances where the acoustic field is coupled along the path of a roller about which the material to be treated is transported.

It is a related object of the present invention to provide an acoustic transducer arrangement for simultaneous electro-osmotic, acoustic and mechanical liquid separation, which transducer arrangement has a curved configuration.

It is a further object of the present invention to provide a method and apparatus employing simultaneous electro-osmotic, acoustic and mechanical solid-liquid separation techniques where a liquid coupling is achieved between an acoustic transducer arrangement and the material to be treated such that the acoustic field is transmitted entirely through a liquid media and into a continuous, moving stream of material to be treated.

It is another object of the present invention to achieve and enhance solid-liquid separation, such as dewatering, by combining a conventional mechanical dewatering step with further, continuous, simultaneous electro-osmotic, acoustic and mechanical dewatering.

These and other objects and advantages of the present invention will become more apparent from the accompanying drawings and from the description which follows.

To achieve the foregoing objects, at least part of the first electrode arrangement is movable relative to a support in unison with a transport element disposed adjacent a second electrode arrangement. A working space is disposed between the first electrode and the transport element for advancing moist material along a processing path while passing electric current through the moist material between the electrodes. An acoustic transducer arrangement disposed adjacent the working space subjects the moist material to an acoustic field as the material moves along the processing path. The acoustic field is generated by multiple acoustic transducers spaced as an array along part of the processing path. An array as used herein of ultrasonic transducers includes a one or two-dimensional distribution of transducers on a surface.

A liquid is enclosed between an acoustic transducer arrangement, on the one hand, and a material moving element and/or electrode, on the other hand, so as to create a space completely filled with liquid. Acoustic energy is transmitted through this all-liquid media, which takes the form of a liquid-filled filtrate chamber, to maximize acoustic transmission and to enhance removal of liquids.

The acoustic transducer array for transmitting the acoustic energy has the shape of a tube truncated in a plane parallel to its axis so as to correspond in shape to part of a roller which serves both as a electrode and as a transport mechanism for the material to be treated. The acoustic transducer arrangement is constructed by bending a flat plate with transducer elements already mounted thereon into a curved configuration.

For enhanced results, the material to be treated is first subjected to a mechanical liquid removal treatment and is thereafter processed by a continuous, combined electro-osmotic, acoustic and mechanical solid-liquid separation technique In certain circumstances, however, mechanical pressure may be limited to that required for conveyance.

BRIEF DESCRIPTION OF THE DRAWINGS

FIG. 8 is a side elevation of the structure shown in FIGS. 6 and 7.

FIG. 9 is a perspective view of the transducer arrangement of the present invention, without the casing, prior to the transducer plate being bent into a curved configuration.

FIG. 10 is a sectional view of the roller of the apparatus of the present invention.

DETAILED DESCRIPTION OF THE PREFERRED EMBODIMENTS

Figure 1:
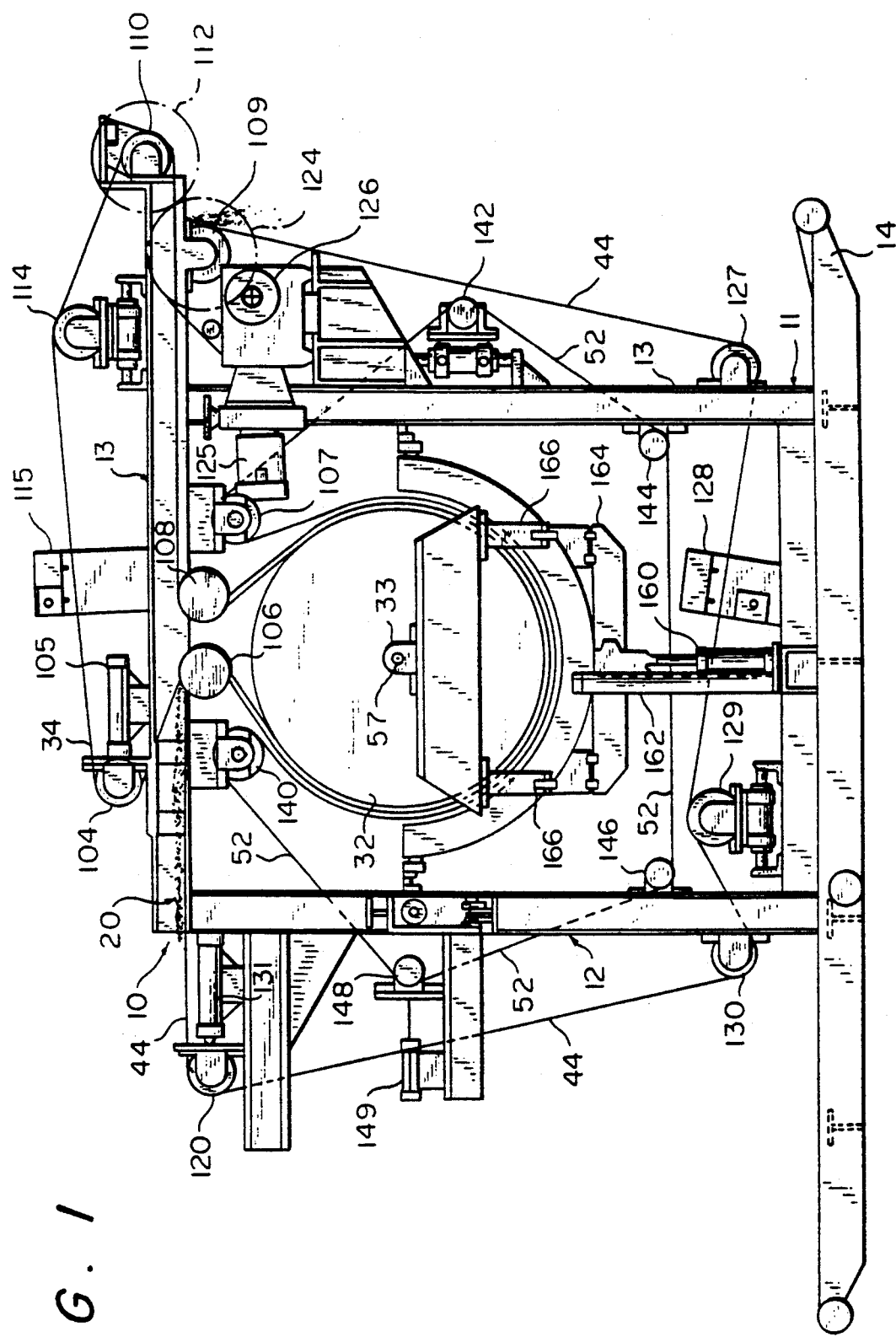
FIG. 1 is an elevational view of an apparatus according to the present invention.
Figure 2:
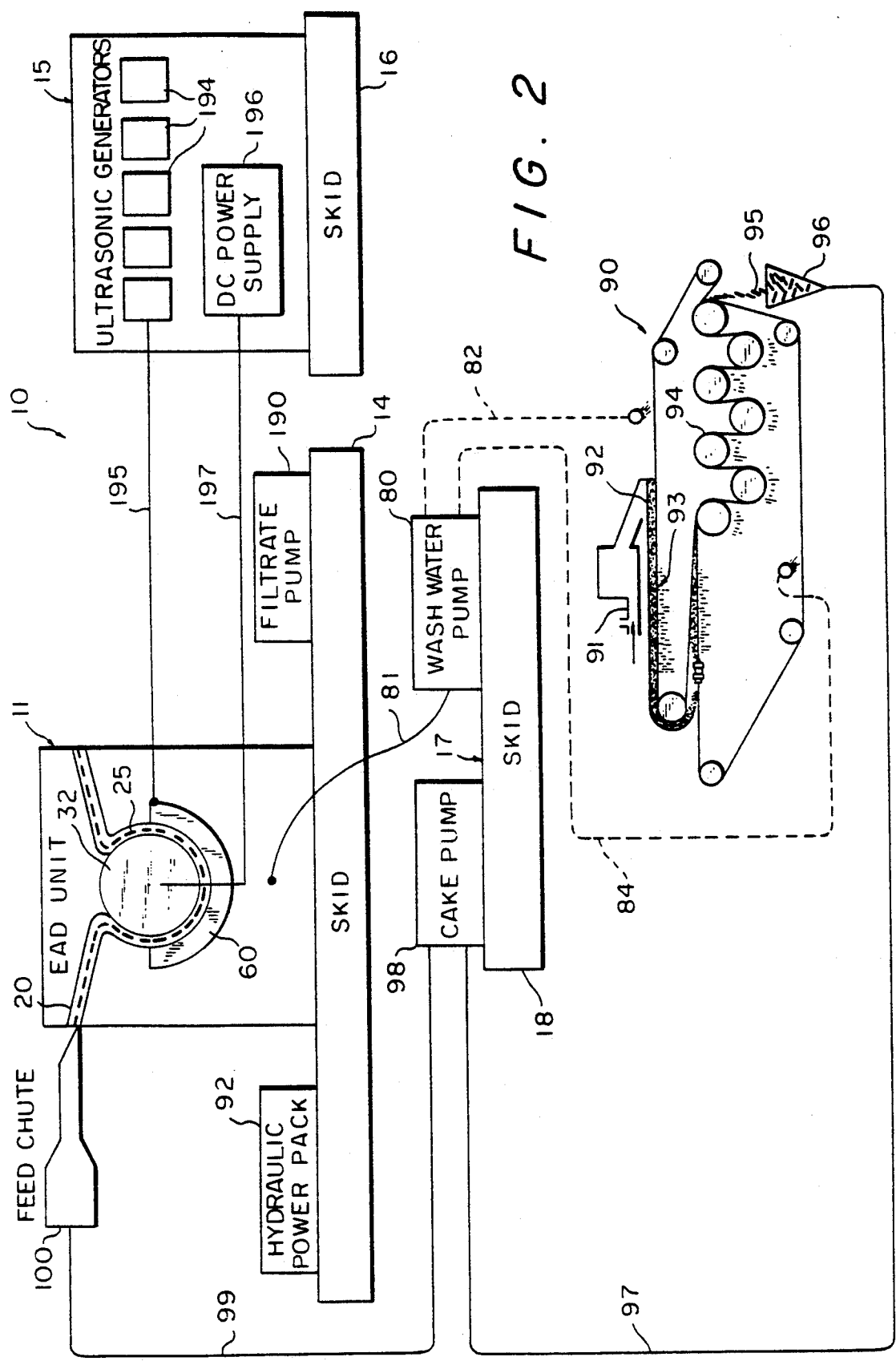
FIG. 2 is a schematic diagram showing the apparatus of the present invention combined with related components.

Referring to FIGS. 1 and 2, reference numeral 10 generally designates an apparatus for continuously removing liquid from a moist material according to an exemplary embodiment of the present invention A moist material as used herein includes suspensions of solids in liquids with a consistency ranging from a dry-to-touch cake to a pumpable slurry. This removal of aqueous or nonaqueous liquid will be referred to herein as "dewatering," and such reference is intended as only an example of one type of liquid removal which may be effected by the present invention. The present invention is not limited to removal of water. Other types of liquid removal are well within the scope of the present invention including, for example, removal of solvents or oils from solid materials.

Reference numeral 11 refers to an overall EAD unit according to the present invention. "EAD" refers to "electroacoustic dewatering" in which the material to be dewatered is subjected simultaneously to an electrical, an acoustical and a mechanical force field.

EAD unit 11 includes a support 12 for mounting of the various components of the unit, which support, in the particular exemplary embodiment shown herein, takes the form of a frame 13. In the embodiment shown and described herein, EAD unit 11, including its frame 13, is mounted on a skid 14. This corresponds with an actual prototype of the invention. In practice, when the device of the present invention is installed at the plant of the user, it is expected that the device will be affixed in the plant of the user rather than being skid mounted.

As shown in FIG. 2, a separate energy source unit 15 provides acoustic energy, preferably in the form of ultrasonic energy, and a source of DC power to the unit 11 in order to create both the electric and acoustic fields. D.C. power as well as acoustic energy can be applied continuously or intermittently. In the exemplary embodiment shown and described herein, energy source unit 15 is mounted on skid 16. When the present invention is part of a plant, it is also expected that energy source unit 15 may be a permanent part of the plant, rather than being skid mounted.

One other skid mounted unit in the particular exemplary embodiment shown and described herein is auxiliary unit 17 which provides for a supply of moist material to be dewatered, as well as a supply of wash water, to unit 11. This auxiliary unit 17 is shown mounted on skid 18 in the particular exemplary embodiment hereof. Again, in a permanent plant installation, the components of auxiliary unit 17 may be permanently installed in the plant rather than skid mounted.

Referring to FIG. 2, it will be seen that the present invention provides for the dewatering of a moist material or cake 20 which, as shown in FIG. 2, travels through a processing path 25 shown in broken lines in FIG. 2.

Figure 3:
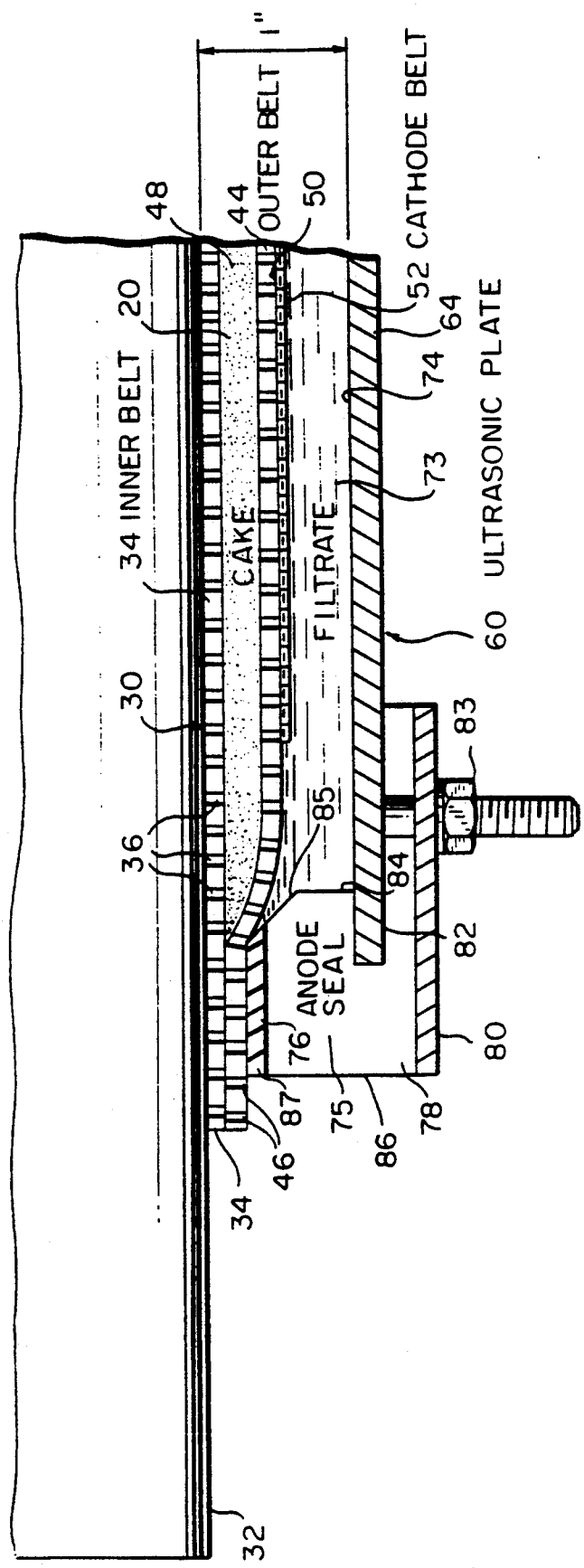
FIG. 3 is a detailed sectional view through a part of the anode roller, the acoustic coupling and the filtrate chamber.

The apparatus of the present invention includes a first electrode arrangement generally referred to by reference 30 (FIG. 3). First electrode arrangement 30 includes an anode roller 32 which is considerably larger (by a factor of approximately 5) than the remaining rollers of unit 11 Anode roller 32, which rotates with respect to frame 13 on bearing 33, represents a positive electrode for the creation of an electric field, which field extends through the cake 20 being dewatered.

Cake 20 may be any substance from which water or other liquid is to be removed. For example, cake 20 may be sewage sludge in need of additional dewatering. Cake 20 may also be a material processed in a food processing operation and may include materials such as corn mash, corn gluten, apple mash, or citrus peels. Cake 20 may also include materials such as ceramic clays or kaolin clays. Cake 20 may also be a coal slurry, clay soaked with vegetable oil, or carbon black soaked with an organic liquid. Regardless of the material being dewatered, the present invention will produce a partially dried material with a minimal expenditure of energy; however, the bulk of the material needs to be exposed to a flow of electric current and ultrasonic waves for effective dewatering.

Unit 11 includes a first continuous, flexible, liquid permeable belt 34 which will ride directly against anode roller 32. Belt 34, whose position with respect to the anode roller 32 is best seen in FIG. 3, may be considered the "inner-belt" among a set of belts. Belt 34 includes a series of passageways 36 therethrough (FIG. 3) which allow water or other liquid to pass through the belt to effect drying or dewatering. The continuous inner belt 34 rides over the anode roller 32. To the limited extent which it does so, part of belt 34 may be considered a component of the first electrode arrangement in that the positive charge of the anode roller 32 acts through belt 34 to provide the electric field in the moist material 20 which has been advanced into surrounding disposition with respect to anode roller 32.

Thus, anode roller 32 and the first continuous belt, which together are part of the first electrode arrangement, are movable relative to support 12 such that the entirety of the first electrode arrangement is movable relative to the support. While, in the particular exemplary embodiment shown and described herein, this entire electrode arrangement is movable, what is particularly important is that at least the portion of the first electrode arrangement which contacts the cake 20 move along with cake 20 through processing path 25 such that there is little sliding motion between moist material 20 and the first electrode arrangement 30.

Unit 11 includes another continuous, flexible, porous belt, namely, belt 44 which represents an outer belt also entrained on anode roller 32 outside of innerbelt 34. Outer belt 44 includes passageways 46 therethrough (FIG. 3) for the passage of water or other liquid removed from cake 20 during the dewatering or liquid removal process.

Outer belt 44, which acts as a transport element, contacts the outside of the moist cake material and moves along with the anode roller 32 as the anode roller describes a circular path. Cake 20 is sandwiched between inner belt 34 and outer belt 44 to define a working space 48 which extends around a majority of the outer circumference of anode roller 32, in which working space 48 the cake 20 is confined.

Unit 11 also includes a second electrode arrangement generally referred to by reference numeral 50. Second electrode arrangement 50, in the particular embodiment shown and described herein, includes a cathode belt 52 of metal material which serves as a negative electrode to complement the positive electrode which takes the form of anode roller 32. Metal cathode belt 52 rides on the outside of outer flexible belt 44, which in turn rides outside of inner flexible belt 34 on anode roller 32. Thus, outer flexible belt 44 is disposed between metal cathode belt 52 and inner flexible belt 34 such that outer flexible belt 44 contacts the moist material of the cake 20 in the working space 48.

Outer belt 44 moves along with cake 20 and cathode belt 52 so as to limit any sliding contact between cake 20 and belt 44 and to minimize electrical resistance between the electrodes and between the outer belt 44 and cathode belt 52. With this arrangement, an intimate contact is obtained between the outer belt and the moist cake and also between the outer belt and the cathode belt to minimize the electrical contact resistance without allowing buildup of resistance between the cathode belt 52 and the outer belt 44, thereby maximizing current flow.

It will be seen that belts 34, 44 act as cake engaging elements which are movable relative to support 12. The inner cake engaging element, i.e. inner belt 34, engages one side of the cake for contributing to transportation of the cake along the processing path 25. The other cake engaging element, i.e. outer belt 44, is movable relative to support 12 and is located in opposed relation to inner belt 34 for further contributing to the transportation of the cake along the processing path 25.

While sliding contact between cake 20 and the cake-engaging elements surrounding it is minimized in the part of the processing path 25 which extends about a portion of the anode roller circumference, and while such minimization of sliding contact is advantageous, all sliding contact is not entirely eliminated. Thus, with an anode roller 32 which is 51 inches in diameter and with a cake thickness of ¾ inch, the travel distance for the cake with respect to the anode roller will be governed by the formula $$(\pi D)(\theta contact)\frac{1}{360}$$

or $$\pi(51 \text{ in.})\frac{2400}{3600} = 106.7 \text{ in.}$$

The travel distance for the cake at the cathode will be:

$$\pi(D + 3/4 \text{ in.})(\theta contact)\frac{1}{360}$$

or $$\pi(51.75 \text{ in.})\frac{2400}{3600} = 108.3 \text{ in.}$$

The difference in these travel distances, which will represent the extent of sliding, is 1.6 inches.

Unit 11 also includes an acoustic transducer arrangement 60 which is affixed to support 12 and disposed adjacent working space 48 for subjecting the cake 20 to an acoustic field concurrently with the moist material also being subjected to the electrical field. The acoustic transducer arrangement 60 partially surrounds anode roller 32 and is disposed closely adjacent to and radially outwardly of the outer flexible belt 44 and cathode belt 52 but separate from the cathode belt 52. That is, acoustic transducer arrangement 60 is physically separate from and functionally independent of both electrode arrangements 30, 50. The acoustic transducer arrangement corresponds in shape to part of a circular path described by the anode roller 32 as it rotates. That is, the shape of acoustic transducer arrangement 60 corresponds generally to the part of the circular path in which the inner and outer belts 34, 44 are in contact with anode roller 32, except that acoustic transducer arrangement 60 does not extend as far around anode roller 32 as the contact area of inner and outer belts 34, 44 or the cathode belt 52 with roller 32. In the particular embodiment shown and described herein, the acoustic transducer arrangement 60 has a shape corresponding to a path of the roller representing a half circle. More specifically, acoustic transducer assembly 60 has the shape of a tube or pipe truncated at its mid-point in a plane parallel to its axis.

Acoustic transducer array 60 includes a transducer plate 64 which faces the working space 48 containing the cake 20 between belts 34, 44. A plurality of transducer elements 65 are disposed as a curvilinear array along the transducer plate 64 with axially running spaces 62 therebetween. Small bends 63 are formed in spaces 62 as will be more fully described hereinafter. As with the overall acoustic transducer arrangement 60 which is disposed in spaced relation to the outer belt 44, transducer plate 64 has a shape of a tube truncated in a plane parallel to axis 66 (FIG. 8) of plate 64 and to the axis of the overall acoustic transducer arrangement 60, which axis 66 happens to be co-extensive with axis 67 of anode roller 32.

Transducer plate 64 has an inside surface 68a which faces anode roller 32 and an oppositely facing outside surface 68b. (See FIGS. 6-8.) The transducer elements 65 are disposed as a curvilinear array in both axially spaced and circumferentially space relationship. That is, transducer elements 65 extend around the circumference of transducer plate 64 and also extend axially from one side of the transducer plate to the other to effectively vibrate the entire outside surface 68b of transducer plate 64, as will be seen from Figs. 6-8. Preferably, transducer elements 65 are ultrasonic transducer elements, such that the acoustic energy generated by acoustic transducer arrangement 60 is in the ultrasonic frequency range.

Figure 4:
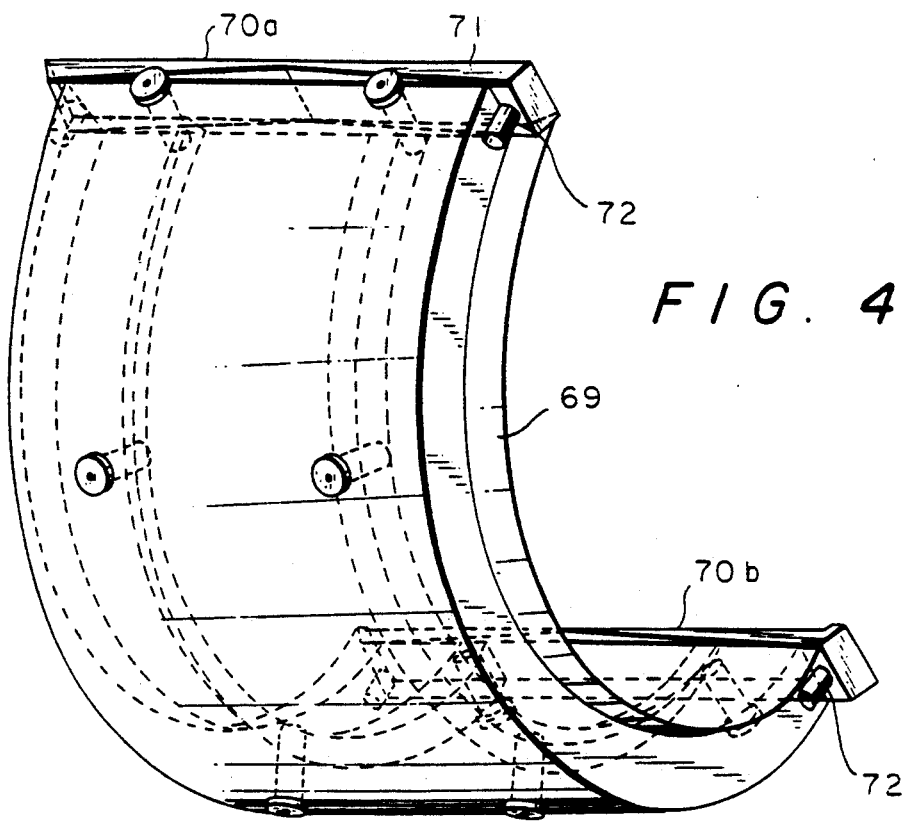
FIGS. 4 and 5 show in perspective the casing for the acoustic transducer arrangement of the present invention.
Figure 5:
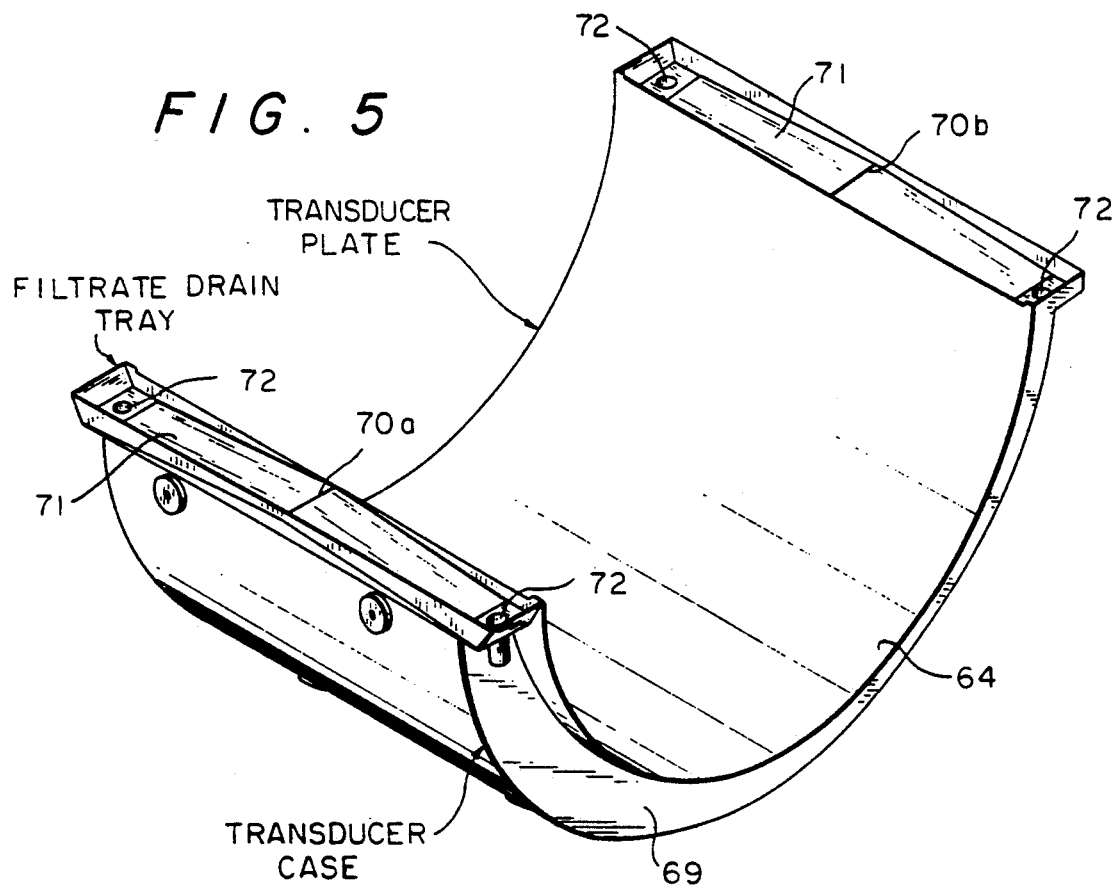

Transducer elements 65 are enclosed by casing 69, which casing is best seen in FIGS. 4 and 5. Casing 69 has a pair of ends 70a, 70b corresponding to regions of the transducer plate 64 where the tube shape of the transducer plate has been truncated in a plane parallel to axis 66. The case has a filtrate drain tray 71 at each end for receiving filtrate produced by the apparatus 10.

Figure 6:
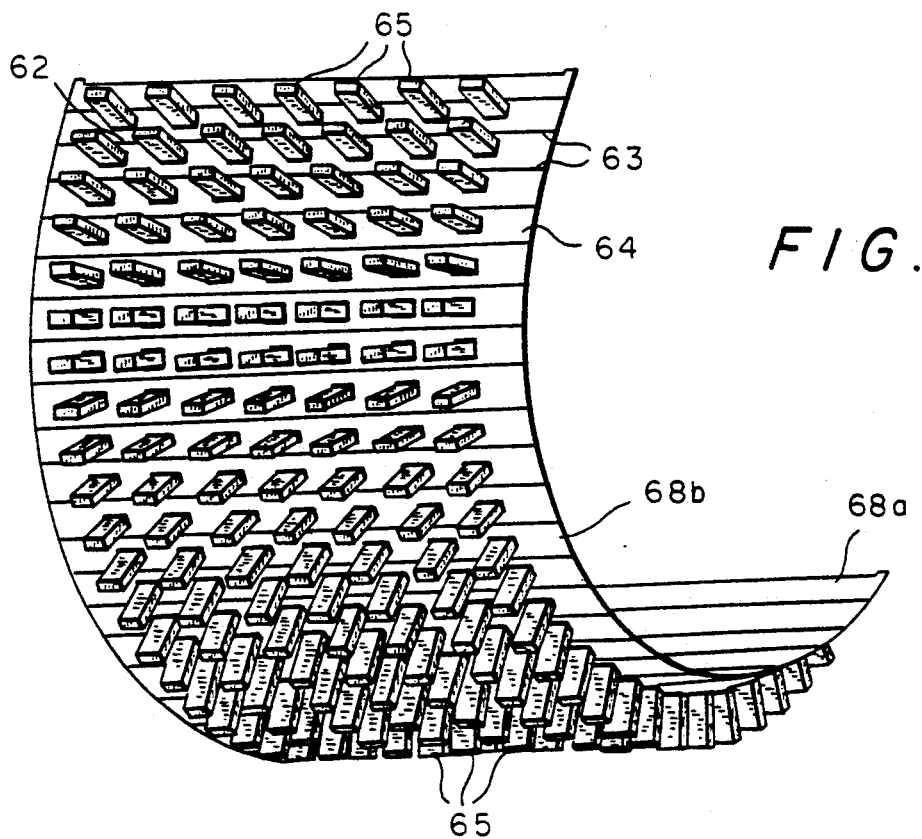
FIGS. 6 and 7 are perspective views of the acoustic transducer arrangement of the present invention without the surrounding casing.
Figure 7:
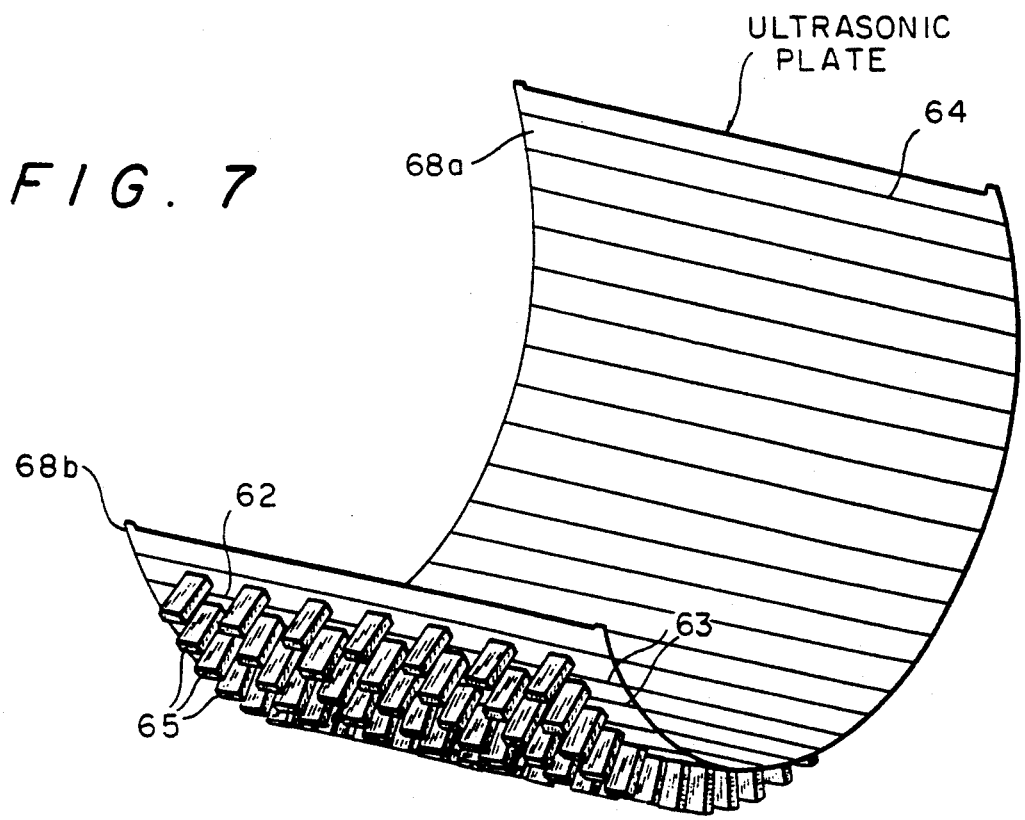

In the construction of acoustic transducer 60, it has been found unfeasible to attach multiple transducer elements 65 to a curved plate 64 as shown in Figs. 6 and 7 when plate 64 is in the curved condition as shown, i.e. when plate 64 has the shape of a tube truncated along a plane parallel to its axis 66. Thus, to produce a construction shown in FIGS. 6-8 which includes multiple transducer elements 65 on a curved plate, the transducer elements 65 are first mounted on a substantially rectangular transducer plate 64' as shown in FIG. 9. Thus, the transducer elements are disposed in spaced relation along both the length and width of the substantially rectangular plate 64'. Thereafter, the rectangular plate 64' is bent around a curved fixture while the multiple transducer elements 65 remain affixed to the plate 64' so that the rectangular plate 64' then assumes a substantially curved shape, i.e. the shape of a tube truncated in a plane parallel to its axis as shown in FIGS. 6-8.

The parts of flat plate 64' on which transducer elements 65 are affixed do not bend when transducer plate 64, is bent into a substantially curved shape. The substantially curved shape is formed by a series of bends 63 in the spaces 62 between the axially running rows of transducer elements 65. That is, each bend 63 runs in the axial direction with respect to the truncated tube shape of plate 64, and virtually every space 62 between every pair of adjacent, axially running rows of transducer elements 65, includes such an axially running bend 63. Thus, while the truncated tube shape will not, upon close inspection, have a smooth continuous curvature, the general overall effect and general appearance from a distance is like that of a continuous curvature.

When cake 20 is interposed between belts 34, 44 about the circumference of anode roller 32 as it is transported along processing path 25, liquid is mechanically pressed out of the cake 20 through passageways 36 in belt 34 and passageways 46 in belt 44 (primarily the latter) due in part to pressure applied to cake 20 as a result of belts 34, 44 squeezing cake 20. Yet, the primary dewatering is enhanced significantly by mechanisms including electro-osmosis, rectified diffusion and shear thinning. When the particles of the cake are negatively charged, as is the usual case, this will create a flow of water or other liquid toward the negative electrode, i.e. toward the cathode belt 52. Water which flows towards cathode belt 52 passes through outer belt 44 as a filtrate 73 which moves around the outer edges of cathode belt 52 to be collected in a filtrate chamber 74 as seen in FIG. 3.

Filtrate chamber 74, which is bounded by the outer belt 44 and the transducer plate 64 of the acoustic transducer 60, is completely filled with liquid filtrate 73 during normal operation. Thus, acoustic energy, preferably ultrasound energy, created by the acoustic transducer arrangement 60, is transmitted through an all-liquid media in the form of the liquid filled filtrate chamber 74 to reach the cake 20 thereby maximizing acoustic transmission and enhancing dewatering. In this regard, ultrasonic energy cannot be transmitted effectively through air or through other gases, yet it can be transmitted very effectively through liquid. The all-liquid media between the transduce plate 64 and the cake 20 thus maximizes acoustic transmission and enhances dewatering. For most efficient operation, this filtrate layer is kept to the minimum and is designed to be between 0.01 inch (0.25 mm) to 0.5 inch (12.7 mm) to accommodate operational variations in cake thickness.

Referring to FIG. 3, a seal 75 extends between the acoustic transducer arrangement 60, and in particular the plate 64 thereof, on the one hand, and the outer belt 44, on the other hand. Seal 75 partially defines filtrate chamber 74. During operation, seal 75 will be stationary, as will be the acoustic transducer plate 64. Seal 75 permits outer belt 44 (along with cathode belt 52 with overlies belt 44) to move relative to the acoustic transducer arrangement 60 while maintaining the filtrate chamber 74 in a completely liquid-filled condition as shown in FIG. 3.

Seal 75, which will have the general overall shape of a half ring truncated along a plane parallel to its axis, includes a band of hard, smooth material 76 extending around that part of the seal closest to outer belt 44. Band 76 of hard, smooth material is backed by a relatively soft, spongy material 78 extending between the acoustic transducer arrangement 60 and band 76. The hard, smooth material of band 76 is preferably high molecular weight polyethylene, or a synthetic fluorine-containing resin material, such as sold under the trademark Teflon, etc. whereas the soft, spongy material 78 is preferably neoprene, buna N, etc.

Band 76 of hard, smooth material is positioned for sliding engagement with the outer belt 44 to contribute to the seal between that belt and the transducer plate 64. The soft, spongy backing 78 of seal 75, is normally partially compressed during operation to hold the hard, smooth band 76 tightly against outer belt 44 to maintain a tight seal.

Soft, spongy material 78 is mounted on a stainless steel plate 80 which in turn is fastened to acoustic transducer arrangement 60 by a fastener 83. The soft, spongy material 78 includes a notched area 82 therein, which notched area faces axially inwardly with respect to the overall seal 75 and which accommodates part of the transducer plate 64, i.e. an axially outermost part of plate 64.

Seal 75 has a side 84 facing the filtrate chamber 74. Seal 75 tapers toward the interior of filtrate chamber 74 in a direction from the outer belt 44 toward the acoustic transducer arrangement 60 as will be seen in FIG. 3.

Seal 75 has a side 86 facing away from filtrate chamber 74. Seal 75 also has an outer taper 87 which tapers away from the interior of filtrate chamber 74 in a direction from the outer belt 44 toward the acoustic transducer arrangement 60, as will also be seen from FIG. 3.

These tapers, i.e. inner taper 85 and outer taper 87 prevent interference between the soft, spongy material 78 of seal 75 and the outer belt 44. When soft, spongy material, such as material 78, is compressed in one area, it tends to billow around the area of compression. Such billowing effect, where not compensated for, would result in the soft, spongy material billowing into engagement with outer belt 44 when the hard, smooth band 76 is pressed against outer belt 44 during normal sealing operation. Tapers 85, 87 remove the material which would otherwise billow into contact with the outer belt 44 and cause rapid wear of seal 75 as well as an accumulation of debris. Accordingly, tapers 85, 87 avoid such an undesirable result.

While only a single seal 75 has been shown and described, it will be understood that a pair of seals, one at each axial end of anode roller 32, cooperate with outer belt 44 and transducer plate 64 to seal off the filtrate chamber 74.

During normal operation, this acoustically activated filtrate chamber both helps in reducing the formation of deposits and helps in cleaning the deposits. The acoustic energy within the filtrate chamber actually aids in removing deposits on the cathode belt formed elsewhere.

While the acoustic transducer assembly has been shown and described through an embodiment in which a single filtrate chamber 74 provides a fluid coupling between the transducer plate 64 and the outer belt 44, it will be understood that a series of smaller, contiguous liquid filled chambers between the acoustic transducers or transducer plate, on the one hand, and the outer belt or material to be dewatered, on the other, may be employed instead.

In the particular exemplary embodiment shown and described herein, the part of the semi-circular processing path which is subject to the application of electrical current flow (which creates electro-osmosis) is the same length as and coincides with the part of the processing path which is subjected to the acoustic field. This, however, need not always be the case. Indeed, it is envisioned that a longer path for the electro-osmotic action and for the mechanical pressure may be advantageous, and this is accomplished by extending the electrodes and/or belts beyond the acoustic transducer arrangement 60.

It has been found that the dewatering unit 11 of the present invention operates most effectively when material fed into unit 11 has first been mechanically dewatered. Such mechanical dewatering may take place, for example, by subjecting the cake 20 to a centrifuge, belt press, vacuum filter, pressure filter, or screw press.

In the exemplary embodiment of the present invention as shown in FIG. 2, an initial mechanical dewatering using a belt filter press 90 is shown. There, an intake feed 91 receives wet material 92 which passes into a gravity section 93 in which excess water will drain through openings in a porous belt. Following the gravity section, the wet material 92 passes into a pressure section 94 where it is squeezed between two porous belts to effect further dewatering. The material is then delivered to a collection vessel 96 from where it may be transported via line 97 to a cake pump 98 and thence via line 99 to a feed shoot 100 which feeds the material into EAD unit 11. Of course, other ways of feeding the material may be used such as screw conveyors, belts, etc.

While a continuous process of providing an initial mechanical liquid removal treatment prior to electro-osmotic and acoustic dewatering has been shown and described, it will be understood that the initial process may be discontinuous. For instance, the mechanical dewatering apparatus, such as belt filter press 90, may be remote from the EAD unit 11. In that case, material to be treated may be taken by truck from the mechanical dewatering unit to the feed shoot 100 (FIG. 2) which feeds the material into EAD unit 11.

With this arrangement, which utilizes initial, conventional, mechanical dewatering followed by simultaneous electro-osmotic and acoustic dewatering, it has been found that at least approximately 50 percent more liquid may be removed from the material to be treated. For instance, in a process where a recovery of 20 percent dry solids was possible using conventional mechanical dewatering alone, it has been found that, by carrying out the conventional mechanical dewatering first and following this with electroacoustic dewatering, 30 percent dry solids have been obtainable using the combined process.

It is expected that refinements in the process and apparatus of the invention may yield even greater increases in the percentage of dry solids obtainable through use of the combined process. Some examples of the increased dewatering for various materials obtainable through the combined process of the present invention are set forth below:

TABLE 1

| Material | % Dry Solids w/Mechanical Dewatering Alone | % Dry Solids w/Present Invention (EAD) |
|---|---|---|
| Sewage Sludge | 15% | 30% |
| Pulp and Paper Sludge | 25% | 40% |
| Coal Tailings | 25% | 40% |

TABLE 1-continued

| Material | % Dry Solids w/Mechanical Dewatering Alone | % Dry Solids w/Present Invention (EAD) |
|---|---|---|
| Coal Slurry | 60% | 80% |
| Corn Gluten | 30% | 40% |
| Corn Fiber Slurry | 30% | 40% |

The entrainment of inner belt 34, outer belt 44, and cathode belt 52 on anode roller 32 has been described The complete paths of those belts to other areas of the EAD unit 11 will now be described.

With respect to inner belt 34, beginning at the upper left of the unit 11 as shown in FIG. 1, belt 34 passes over roller 104, which includes an adjusting mechanism 105 for providing proper tension on the belt. Belt 34 then passes to roller 106, whereupon it extends around anode roller 32 in the manner previously described.

All three belts, 34, 44 and 52 will come off the anode roller 32 at the right of FIG. 1, whereupon cathode belt 52 diverges from belts 34 and 44 to pass over roller 107, while belts 34 and 44 pass over roller 108. Thereafter, belts 34 and 44 pass to roller 109, whereupon they diverge. Inner belt 34 then passes over roller 110, a driven roller which receives power through gear 112. Belt 34 then passes over roller 114, through a belt cleaner 115 and then to roller 104, whereupon the loop is complete.

With respect to outer belt 44—and beginning again at the upper left—belt 44 passes over roller 120 for a horizontal run to roller 106 at which outer belt 44 and inner belt 34 come together and overlie one another. Material 20 to be dewatered will be deposited by feed shoot 100 (FIG. 2) on belt 44 in the area of the horizontal run between rollers 120 and 106. At roller 106 the material 20 will be sandwiched and squeezed between inner belt 34 and outer belt 44 in preparation for passing around anode roller 32.

It will be apparent that outer belt 44 passes from roller 106 around anode roller 32, as previously described, and thence around roller 108 and to roller 109, as also previously described. Outer belt 44 then passes around roller 109 where it diverges from inner belt 34, roller 109 serving as a drive roller for outer belt 44. Roller 109 receives power through gear 124 which is driven by motor 125 through gear box 126. From there, outer belt 44 passes around roller 127 and thence extends through belt cleaner 128 to roller 129, around roller 130, and back to roller 120 to complete the loop. Roller 120 includes an adjusting unit 131 for maintaining the proper tension on belt 44. The tension on belt 44 and its wrapping around roller 32 results in application of a mechanical force on the moist material.

Turning to the path followed by the cathode belt 52—and again beginning at the upper left in FIG. 1— belt 52 passes over roller 140 and thence around anode roller 32 to roller 107. At roller 107, cathode belt 52 diverges from belts 34 and 44 and passes around roller 142, then roller 144, roller 146 and finally roller 148. Roller 148 includes an adjusting unit 149 for maintaining the proper tension on cathode belt 52. From roller 148, belt 52 extends to roller 140 to complete the loop.

The filtrate chamber 74 and seal 75 for confining filtrate 73 about part of the circumference of the anode roller 32 includes a coupling concept by which the acoustic transducer arrangement 60 may be moved into and out of sealing engagement with the anode roller 32 to make the filtrate chamber 74 accessible to the operator when the EAD unit 11 is not in use. By allowing access to the filtrate chamber 74, the chamber may be cleaned when it is not in use and cleared of any accumulated debris.

This is accomplished through use of a hydraulic cylinder 160 (FIG. 1) and associated guide 162 on which a frame 164 is moved with respect to another set of guides 166. The frame 164 is coupled with the acoustic transducer arrangement 60 to move it into and out of engagement with the anode roller 32 by the action of hydraulic cylinder 160.

Figure 11:
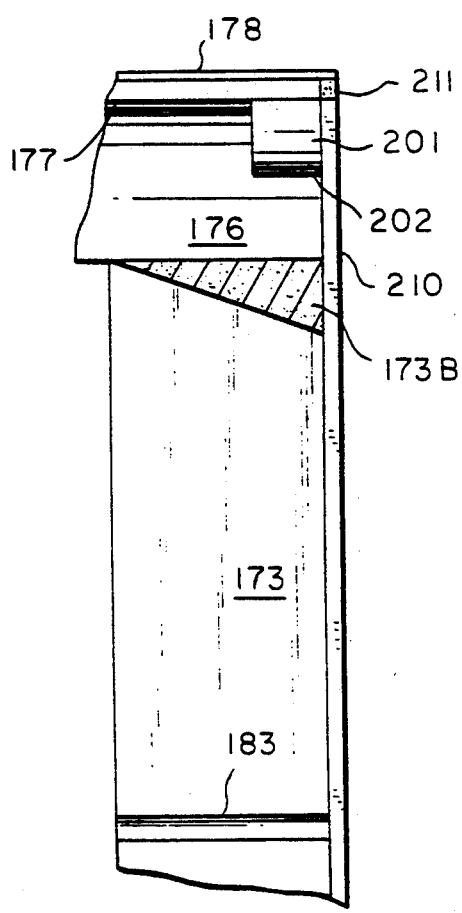
FIG. 11 is a fragmentary detailed sectional view of a part of the roller of FIG. 10.
Figure 12:
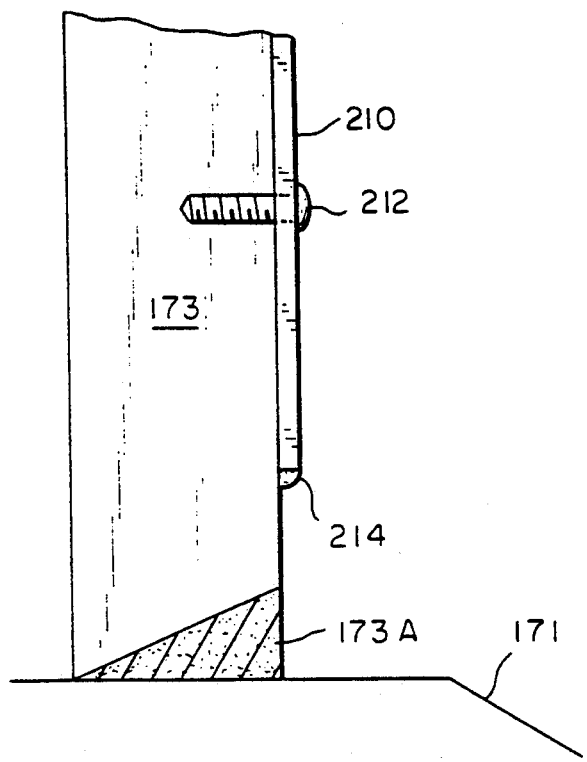
FIG. 12 is a fragmentary detailed sectional view of a part of the roller of FIG. 10.
Figure 13:
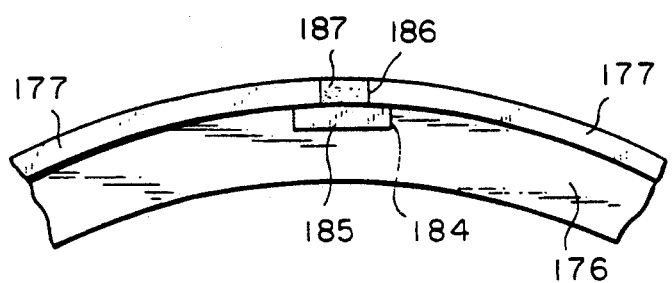
FIG. 13 is a fragmentary detailed sectional view of a part of the roller of FIG. 10 at cutaway 13.

Details of the anode roller itself are shown in FIGS. 10, 11 and 12.

The anode roller includes a pair of stub shafts 170, 171. Stub shaft 170 is attached to circular outer face 172 of the anode roller, and stub shaft 171 is attached to the circular outer face 173. At the inner end, stub shaft 170 is attached to a circular inner support 174. Similarly, the inner end of stub shaft 171 is attached to circular inner support 175.

A stainless steel roll 176 extends around the periphery of the anode roller 32. Overlying stainless steel roll 176 is a titanium sleeve 177 which is seam welded to roll 176. Roll 176 can be of other metals as required for particular applications.

Stainless steel roll 176 of the anode roller 32 is rolled from oversize 304 stainless steel plate ⅜-inch thick and 54 inches wide. The length of this plate is that which will roll into a cylindrical shell of 50.125 inches inside diameter and 51.625 inches outside diameter, so that the maximum stock removal will be 0.375-inch radially. There is no machining of the titanium sheet that is later affixed to this stainless steel cylindrical shell. The rolled stainless steel is welded to form a complete cylinder, and then it is rerolled to make it round within ⅛-inch.

The circular outer faces, 172 and 173, and circular inner supports, 174 and 175, are plasma cut, and the inside diameters and outside diameters are machined for full-penetration welds. Weep holes 180, 181, 182, 183, are drilled and tapped. The stub shafts 170 and 171 are cut from 5-inch diameter, 17-4 pH bar stock, and small steps are machined in one end of each for fitting into the circular inner faces. The circular inner supports and stub shafts are welded together from one side only, as illustrated in FIG. 10 at 174A and 175A to form a first and second plate/stub assembly.

The shell is forced round externally, and the circular inner supports with stub shafts are pressed into place at accurately measured depths from each end of the shell. The circular inner supports are welded to the shell with a full penetration weld completely round the perimeter 174B and 175B. The circular outer faces are inserted over the stub shafts and welded with full penetration completely around the perimeter to the stub shafts 172A and 173A and to the shell, 172B and 173B. The resulting weldment is stress relieved.

Next a central reference axis 67 is provided that is useful for fabricating the remainder of the roller 32. The stress-relieved weldment is indicated on the outside diameter of the shell, and from these measurements, centers are drilled into the stub shafts 170A and 171A. The stub shafts are milled to length, to obtain the overall end-to-end dimension of 69.375 inches. Four spots are milled into the outside diameter of the cylindrical shell at each end, concentric with the stub shaft center. The cylindrical shell is chucked in a lathe on the outside diameter, with the four spots being checked for centering. The stub shaft on the opposite end of the cylindrical shell is placed in a live center. The diameters of the stub shaft next to the live center is turned, the circular outer face is turned, and the outside diameter of the cylindrical shell is turned along a large portion of its length, up to near the chuck jaws. The weldment is rotated end-for-end in the lathe, chucked on the outside diameter where it was just turned, and the region of the outside diameter where it was previously chucked is turned. The circular outer face now nearest the live center is faced, and the diameters of the stub shaft now in the live center are turned.

The outside diameter of roll 176 is turned in several passes to obtain not greater than 0.005-inch total indicated runout (TIR). A groove 184 0.380-inch by 0.093-inch deep is milled in the axial direction on the outside diameter of roll 176 The roll is cleaned with methyl ethyl ketone (MEK). A titanium backing plate 185 is fitted to the groove 184 in the roll 176. The exposed surface of this backing plate is hand ground to form a radius like that of adjacent roll 176.

A titanium sheet, 0.062-inch thick, is seam-welded to obtain the proper length and width for fitting on top of roll 176. The titanium sheet is rolled to just less than a 360-degree circle to form sleeve 177, and is cleaned with MEK. The rolled titanium sleeve 177 is warmed, strapped onto the roll 176, and tack-welded to the backing plate 185 every two inches. The seam 186 in titanium sleeve 177 is welded along its complete axial length. The weld area 187 is cleaned and inspected along its entire length with a penetrant. Copper bars formed into rings 201, illustrated in FIG. 11, are inserted in grooves 202 at the ends of roll 176. These grooves 202 were machined at the time the outside diameter of the roll 176 was turned. Discs 210 of 0.062-inch thick titanium are welded on their outside diameters to the ends of titanium sleeve 17 at weld 211. The inner diameters of the titanium discs are sealed with a sealant 214 such as a bead of silicone and the discs are fastened to the stainless steel end plates with titanium threaded fasteners 212, as illustrated in FIG. 12. The sealant in FIG. 12 is necessary to prevent stray liquids from entering the space between, for example titanium disc 210 and the circular outer face 173. The function of the copper bars 202 is to isolate the titanium joint, for example, between sleeve 177 and disc 210 from the stainless steel roll 176, to prevent the stainless steel from contaminating the titanium weld.

An electrical connection is made to anode roller 32 by enlarging center 171A drilled in stub shaft 171 and tapping threads to allow fitting of a commercial rotary contact.

The titanium has a unique property of oxidizing at the surface when connected to the anode. The oxide surface is passive and is a nonconductor of electricity and, therefore, prevents corrosion. In this regard, it is not feasible to coat the roller with paint or the like, since such coating which would interfere with the roller functioning as an anode.

Therefore, a very thin platinum coating 178 or other non-passivating insoluble noble metal coating (FIG. 11) on the titanium sleeve 177 which ensures that the anode roller 32 will not act as a sacrificial anode. This is important because sacrifice of material from the anode roller 32 would weaken the structure of the anode roller, which would be unacceptable. The titanium sleeve can be approximately 0.02 to 0.13 inches thick with 0.0625 inches preferred. The platinum coating can be approximately 20–200 micro (i.e. $10^{-6}$) inches thick with less than 100 micro inches preferred.

The platinum coating 178 is applied to anode roller 32 by placing a very small amount (due to its very high expense) of liquid platinum salt only at the bottom of a titanium bath vessel corresponding in shape to the anode roller 32. Current is passed from the bath to the drum in an electro-plating operation as the roll 32 is rotated through the small amount of platinum salt at the bottom of the bath. Normally the bath would be substantially filled with material to be electroplated to the roll 32, but it has been found that the electroplating can be accomplished with only a small amount of liquid platinum salt at the bottom. The titanium construction of the bath vessel ensures that the liquid platinum salt in the bath is not contaminated as it would be if steel were used.

Titanium-like materials that passivate on oxidation, such as niobium, may be substituted for titanium in the bath and roll 32. Similarly, other platinum group metals such as ruthenium, rhodium, palladium, and the like can be substituted for platinum. It is also possible to use other insoluble coatings, such as combinations of oxides of platinum, ruthenium, irridium, and the like which can be thermally deposited on titanium sleeve 17 rather than electroplated.

A further embodiment of the invention provides for a method for producing the roller 32. Generally, a metal roller is provided having first and second circular outer faces centered on a shaft and an outer cylindrical surface. Further processing steps include: providing a central reference axis for the shaft; machining the outside of the cylinder to minimize out-of-roundness and machining circumferential groove in each end of the cylindrical shell; milling an outer axial groove the full length of the outer cylindrical surface; filling the axial groove with a strip of titanium extending the full length of the groove; forming a titanium sheet into a cylindrical sleeve and placing over the outer surface of the steel roller; aligning the ends of the formed titanium sleeve over the axial groove and welding the ends to the titanium in the groove and to each other; inserting a copper ring into each circumferential groove; providing first and second annular discs of titanium and welding their outside diameters to the respective ends of the titanium sleeve; sealing and fastening the first and second titanium discs to the respective circular outer faces; and applying a platinum coating on at least the outer curved surface of the cylinder.

The invention further includes a method for making a roller that comprises the steps of providing a first and second stub shaft; welding a first circular inner support and a second circular inner support in axial relationship on each stub shaft to form a first and second plate/stub assembly; rolling a metal plate into a cylindrical shell and welding to form a cylinder; placing and welding in place first and second plate/stub assemblies in respective ends of the cylinder at a predetermined distance; placing a first circular outer face and a second circular outer face over the respective stub shafts, so as to form outer end plane walls of the cylinder, and welding the outer faces to the respective stub shafts and to the inner surface of the cylindrical shell; relieving the stresses resulting from welding operations; providing a central reference axis for the stub shafts; machining the outside of the cylinder to minimize out-of-roundness and machining a circumferential groove in each end of the cylindrical shell; milling an outer axial groove the full length of the cylindrical shell; filling the axial groove with strip titanium extending the full length of the groove; forming a titanium sheet into a cylindrical sleeve and placing over the outer surface of the steel roller; aligning the ends of the formed titanium sleeve over the axial groove and welding the ends to the titanium in the groove and to each other; inserting a copper ring into each circumferential groove; providing first and second annual discs of titanium and welding their outside diameters to the respective ends of the titanium sleeve; sealing and fastening the first and second titanium discs to the respective circular outer face. Finally, there is applied a platinum coating on at least the outer curved surface of the roll 32. Preferably, the platinum coating extends up the ends of the roll 32.

Referring to FIG. 2, and specifically to auxiliary unit 17, it is noted that the apparatus includes a wash water pump 80 which feeds liquid to the belt cleaner 115 and 128 via line 81 to keep the belts clean. Wash water pump 80 may also be used to clean the belts of the conventional belt filter press 90 used for the first step of the process, if belt press 90 is part of a continuous line which incorporates the EAD unit 11. In that case the wash water is fed to belt filter press 90 via lines 82 and 84.

As will be seen from FIG. 2, EAD unit 11 also includes a filtrate pump 190. Filtrate pump 190 pumps liquid, preferably cool water, into filtrate chamber 74. Cooling water mixes with filtrate water which has been removed from the cake 20, and this addition of cooling water assures that the filtrate chamber is completely filled with liquid and also to provide for cooling of the anode and the belts and to help remove gas. The degree of cooling can be controlled by adjusting the ratio of cold water mixed with the filtrate water. The constant influx of liquid both by way of removing filtrate from the cake 20 and by way of pumping cooling water into filtrate chamber 74 is balanced by a discharge of filtrate from the ends 70a, 70b of casing 69 of the acoustic transducer arrangement 60. That is, liquid flows from ends 70a, 70b of the casing 69 into the filtrate drain tray 71 and out the drain conduits 72. The cooling liquid should be a liquid which is compatible with the liquid removed.

As will be seen from FIG. 2, the EAD unit 11 also includes a hydraulic power pack 92 for operating the various hydraulic cylinders, adjusters and other moveable elements of the EAD unit.

The energy source unit 15 includes a series of acoustic generators, preferably ultrasonic generators 194, each generator going to several ultrasonic transducer elements 65 to drive those transducer elements to produce an ultrasonic field through the cake 20 in the processing path 25. Line 195 connects the ultrasonic generators with the acoustic transducer arrangement 60. The energy source unit 15 also includes a D.C. power supply 196 for furnishing electric power to the anode roller 32 and the cathode belt 52 (through rollers 140 and 107), and to provide the electric field for electroacoustic dewatering. Line 197 connects the DC power supply 196 to the anode roller 32 by rotary contact fitted at 171A. Intermittent D.C. power and/or intermittent ultrasonic power may also be used. The current is supplied to the anode roller 3 and cathode rollers 140 and 107 by use of a rotary mercury contact located at the shaft of each roller.

The discussion herein has assumed that the material from which liquid is to be removed has a negative zeta potential. For this case, the anode and cathode arrangement are as discussed herein. If material with a positive zeta potential is to be treated, the electrode arrangement will be reversed.

A further embodiment of the invention provides for the integration of the second electrode arrangement with the transducer arrangement so as to form one unit. The second electrode will thus function simultaneously as the ultrasonic plate.

While the invention has been described in connection with a certain preferred embodiment, it will be understood that many modifications, variations and different embodiments of the invention are possible within the spirit and scope of the appended claims.

What is claimed is:

1. An apparatus for continuously removing liquid from a moist material which is advanced along a processing path, the apparatus comprising:
   a support;
   a first electrode arrangement coupled with said support, at least part of said first electrode arrangement being movable relative to said support;
   a second electrode arrangement coupled with said support;
   a movable transport element, at least part of which is disposed adjacent said second electrode arrangement, said transport element being movable relative to said support and in unison with at least the movable part of said first electrode arrangement, at least part of said transport element being liquid permeable;
   a working space between said first electrode arrangement and said transport element, so that said movement of said part of said first electrode arrangement which is movable and said transport element in unison continuously advances the moist material along the processing path, said first and second electrodes providing an electrical potential between them in said working space to effect flow of electrical current through the moist material while in the working space; and
   an acoustic transducer arrangement coupled with said support and disposed adjacent said working space for subjecting the moist material in said working space to an acoustic field concurrently with the moist material also being subjected to the electrical field;
   whereby at least part of said first electrode continuously moves along with the moist material in the processing path while the material is subjected to both an electrical and acoustical field in a continuous process, thereby providing continuous movement of the moist material with little sliding motion between the moist material and the electrode arrangements; and
   wherein said first electrode arrangement includes an anode roller and a first continuous, flexible belt which rides over the anode roller and which continuous belt is disposed between the anode roller and the working space, such that said first flexible belt contacts the moist material in said working space, said anode roller and said first continuous belt being movable relative to said support such that the entirety of the first electrode arrangement is movable relative to said support.

2. An apparatus as defined in claim 1 wherein said acoustic transducer arrangement comprises a set of ultrasound transducers.

3. An apparatus as defined in claim 2 wherein said second electrode arrangement includes a continuous metal cathode belt and wherein said transport element includes a second continuous, flexible, liquid permeable belt disposed between said metal cathode belt and said first flexible belt, such that said second flexible belt contacts the moist material in said working space, said cathode belt and said second flexible belt being movable relative to said support.

4. An apparatus as defined in claim 3 wherein said anode roller describes a circular path as it rotates and wherein said second belt and said cathode belt are entrained on said anode roller so as to minimize electrical contact resistance and to provide an electrical current flow between said electrode arrangements over a substantial portion of the circular path of the anode roller.

5. An apparatus as defined in claim 4 wherein said acoustic transducer arrangement partially surrounds said anode roller and is disposed closely adjacent to and radially outwardly of said second flexible belt and said cathode belt, said acoustic transducer arrangement corresponding in shape to said part of the circular path described by said anode roller as it rotates.

6. An apparatus as defined in claim 5 wherein said acoustic transducer assembly has the shape of a tube truncated in a plane parallel to its axis.

* * * * *